United States Patent [19]
Makimura et al.

[11] Patent Number: 5,284,226
[45] Date of Patent: Feb. 8, 1994

[54] CARRIAGE GUIDING POST IN A TRANSFER LIFTER

[75] Inventors: Katsuyoshi Makimura, Kobe; Kazuhiko Koyama, Osaka; Masahiro Ishibashi, Toyonaka, all of Japan

[73] Assignee: Daifuku Co., Ltd., Osaka, Japan

[21] Appl. No.: 971,300

[22] Filed: Nov. 4, 1992

[30] Foreign Application Priority Data

Dec. 11, 1991 [JP] Japan .................................. 3-351421
Dec. 11, 1991 [JP] Japan .................................. 3-351423
Dec. 11, 1991 [JP] Japan .................................. 3-351424

[51] Int. Cl.$^5$ .............................................. B66B 7/02
[52] U.S. Cl. ........................................ 187/95; 187/94; 52/745.17
[58] Field of Search ...................... 187/2, 6, 94, 95; 52/745.17, 731.1, 731.2

[56] References Cited
U.S. PATENT DOCUMENTS 3,880,258  4/1975  Rompa .................. 187/95
5,054,985 10/1991  Wagatsuma et al. ..... 187/95

*Primary Examiner*—D. Glenn Dayoan
*Assistant Examiner*—Kenneth Noland
*Attorney, Agent, or Firm*—Schweitzer Cornman & Gross

[57] ABSTRACT

A carriage guiding post in a transfer lifter, is a four-sided support post of an approximately square shape in cross section the support post having carriage guiding rail recesses provided in three of the four sides thereof, and a counter weight guiding rail track provided on the remaining side of the support post, the carriage guiding rail recesses and the counter weight guiding rail all extend continuously throughout the length of the support post, wherein the counter weight guiding rail track is a rib projecting from a central region of the side of the support post and extends lengthwise thereof, the rib having an approximately isosceles triangle shaped cross section.

10 Claims, 13 Drawing Sheets

CARRIAGE GUIDING POST IN A TRANSFER LIFTER

TECHNICAL FIELD OF INDUSTRIAL APPLICATION

The present invention relates to a support post for guiding a lifting carriage in a transfer lifter known as a drop lifter or table lifter in which a carrier means, e.g. an electric carrier cart, running on a track is transferred from one height level to another by lifting action.

BACKGROUND OF THE INVENTION

There are known two different types of such a transfer lifter, single post type transfer lifter for transfer of small, light loads and dual post type transfer lifter for transfer of bulky, heavy loads. It would be understood that a larger transfer lifter having two pairs of support posts arranged in parallel is also available.

The traditional support posts for guiding the lifting carriage are different in the cross sectional shape between the single post type and the dual post type. Hence, more than one of the types of the support posts are needed for use, which will increase the cost of a transfer system. Also, such a traditional support post has commonly guide rails projecting outward therefrom for guiding the lifting carriage. The projecting guide rails tend to be damaged from hitting against other objects during transportation or installation.

It is a primary object of the present invention to provide a carriage guiding post which can equally be employed in both a single post type transfer lifter and a dual post type transfer lifter and also, has carriage guide rail means arranged to be hardly injured.

In common, the carriage guiding post of the present invention is intended for mounting on a base and/or carrying at top a carriage lift driving means, thus being a member component of a transfer lifter. It is also possible that two or more of the carriage guiding posts are coupled lengthwisely for matching the extensive length of carriage lifting movement. It is thus another object of the present invention to provide a carriage guiding post which can be coupled to another carriage guiding post or other components easily and accurately.

SUMMARY OF THE INVENTION

For achievement of the foregoing object, a carriage guiding post according to the present invention comprises a four-sided support post of an approximately square shape in cross section having Carriage guiding rail recesses provided in three of the four sides thereof and a counter weight guiding rail track provided on the remaining side thereof which all extend continuously throughout the length of the support post.

For use in a transfer lifter of the single post type, the carriage guiding post of the present invention is arranged upright with its counter weight guide rail track towards the back while a lifting carriage is provided in front of the carriage guiding post for upward and downward movement. The lifting carriage has forward and backward positioning guide rollers rotatably mounted thereto for running in and along the rail recesses of the two, left and right, sides of the carriage guiding post and leftward and rightward positioning guide rollers rotatably mounted thereto for running on the two, left and right, inner walls of the rail recess of the front side of the same.

For use in a transfer lifter of the dual post type, two of the carriage guiding posts are arranged upright with their counter weight guide rail tracks facing each other, while a lifting carriage is provided in front of the two carriage guiding posts for upward and downward movement and in addition, a counter weight is provided between the two carriage guiding posts for movement in the opposite direction to the lifting carriage. The lifting carriage has forward and backward positioning guide rollers rotatably mounted thereto for running in and along the rail recesses of the outer sides of their respective carriage guiding posts and leftward and rightward positioning guide rollers rotatably mounted thereto for running in and along the rail recesses of the front sides of the same. The counter weight has guide rollers rotatably mounted thereto for running on the counter weight guide rail tracks of the inner sides of the two carriage guiding posts.

As understood, the carriage guiding post of the present invention can equally be utilized in both a single post type transfer lifter for transfer of small, light loads and a dual post type transfer lifter for transfer of large, heavy loads. In either type, the lifting carriage are provided with the forward and backward positioning guide rollers and the leftward and rightward positioning guide rollers which are rotatably arranged in pairs at both left and right so that it can travel upward and downward in steadiness. Also, the counter weight provided particularly in the dual post type transfer lifter for ease of lifting a bulky, heavy load can smoothly travel in the opposite direction as being guided between the two carriage guiding posts. The lifting carriage has a C shape holding the carriage guiding post from three, front, left and right, sides and its positioning guide rollers run in and along the rail recesses of the carriage guiding post, whereby the physical strength of the transfer system will be increased and the number of substantial components for the purpose will be minimized.

The carriage guiding post incorporates no troublesome rail projections but the rail recesses for guiding the lifting carriage and will have less chance to be damaged from hitting against other objects during transportation or installation. Also, the installation of the carriage guiding post will be facilitated.

Although the carriage guiding post may have a square shape in cross section, it is preferred to have a rectangular shape in cross section, in which the carriage guiding rail recesses are provided in the two short sides and one of the two long sides thereof, the rail recess in the long side being greater in width than those in the two short sides, and the counter weight rail track is provided on the other long side. Accordingly, the construction of the carriage guiding post when used in a single post type transfer lifter will allow the entire system to be minimum in the depth and when used in a dual post type transfer lifter, to be minimum in the width. The carriage guiding post of the present invention will thus contribute to the compact size of either transfer lifter.

For ease of mounting to a base or coupling one after another, the carriage guiding post of a rectangular shape in cross section according to the present invention has a plurality of T-slotted grooves provided in the four sides thereof for holding jigs or the like. In particular, each short side has one groove and each long side has two grooves. Each of the grooves which extend continuously throughout the length of the carriage guiding post is defined by two, left and right, L-shaped projections which face at distal end each other. The short side groove is formed at the center of the short side between the two, left and right, L-shaped projections. The long side grooves are designated on both sides of the counter weight guiding rail track and of the carriage guiding rail recess.

The carriage guiding post of the present invention which has the jig holding grooves in the four side can be coupled to other components easily and securely, e.g. at lower end to a base and/or at upper end to a platform, with L channels inserted and held in the jig holding grooves. At least one of the two long sides of the carriage guiding post has two, left and right, jig holding grooves provided on both sides of the wide rail recesses, thus being secured at both ends with the L channels. Accordingly, the coupling of the carriage guiding post to the other component such as the base or the platform will be strengthened in the transfer lifter which thus become rigid in arrangement.

Also, the carriage guiding post of the present invention has at least two lengthwisely extending alignment bores provided therein. For coupling of two of the carriage guiding posts, two alignment pins are fitted into at one end to the alignment bores of one carriage guiding post and at other end to the alignment bores of the other carriage guiding post. As the two carriage guiding posts remain coupled to each other without misalignment, they are tightened with the use of jig plates accommodated in their )19 holding grooves. As the result, there will hardly be produced a step or gap between the two carriage guiding posts so that the lifting carriage can smoothly travel in the carriage guide rail grooves of the same.

In case that a mounting plate is provided for ease of installation of the carriage guiding post, corresponding alignment holes to the alignment bores of the carriage guiding post are formed in the mounting plate. Accordingly, the carriage guiding post can fixedly be mounted to a given location of the mounting plate with ease and accuracy using like alignment pins.

Preferably, the alignment pin has a rib flange provided on a center region of the side periphery thereof. Also, at least one of the two corresponding alignment bores or either the bore or the hole to be joined is radially enlarged at opening end to accept the rib flange of the alignment pin. Hence, the alignment pin can evenly be inserted into the two corresponding bores or the bore and the hole for secure coupling.

The installation of the carriage guiding post of the present invention may involve height and level adjustment. For the purpose, the mounting plate coupled to the lowermost end of the carriage guiding post is arranged having slot openings into which guide studs mounted on a base is slidably inserted for vertical displacement and supported with sets of adjusting bolts and nuts fixedly mounted on the base. This arrangement allows the carriage guiding post to be adjusted in height and level by loosening and tightening the adjusting bolts and nuts.

More preferably, the carriage guiding post of the present invention is fabricated by extrusion forming of an aluminum material to a given length in which the carriage guide rail recesses, the counter weight guide rail track, and if desired, the L-shaped projections of the jig holding grooves are all formed integrally at one process. As the result, the carriage guiding post will be light weighted, anti-rust finished, and precision sized allowing the lifting carriage to travel smoothly and securely.

DETAILED DESCRIPTION OF THE PREFERRED EMBODIMENTS

Construction of support post

Figure 1:
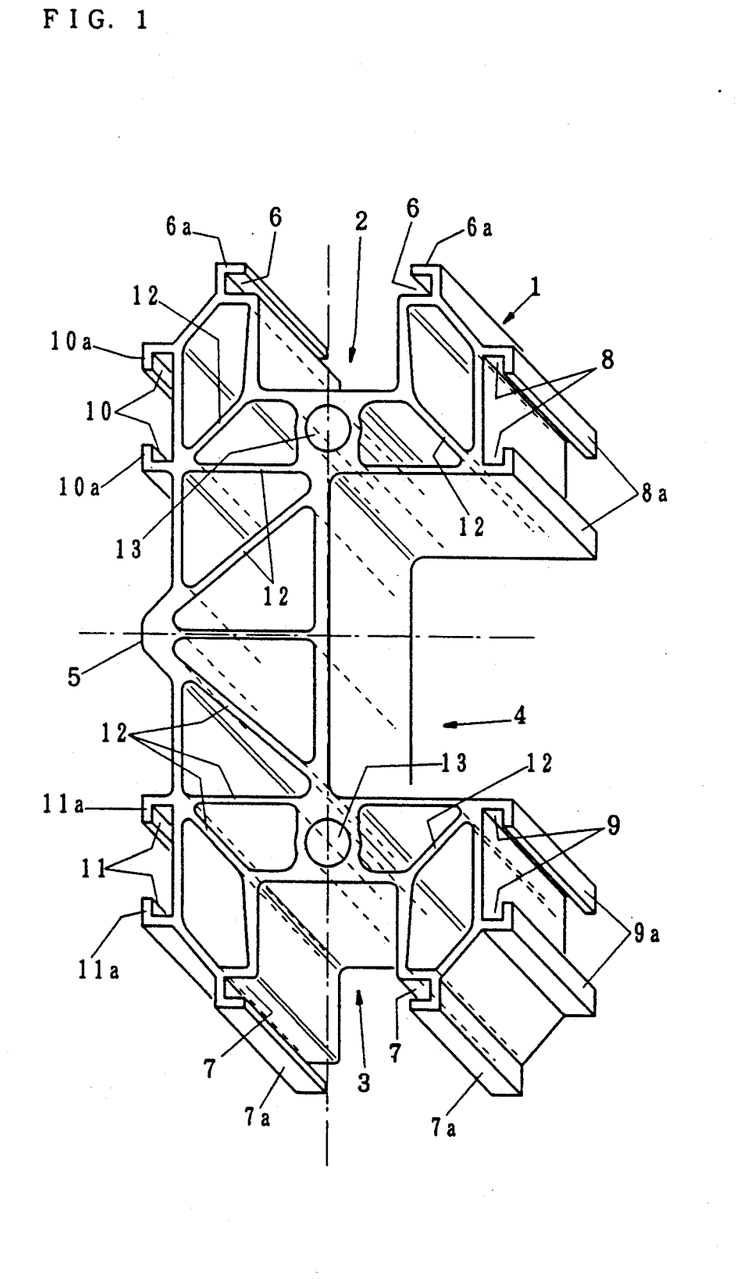
FIG. 1 is a perspective view showing the construction of a support post of the present invention.

As shown in FIG. 1, a support post 1 according to the present invention is provided for guiding a carriage by integral and lengthwise extrusion forming of an aluminum material. The support post 1 is formed of an approximately rectangular shape in cross section having four corners beveled. The support post 1 has three rail recess 2, 3, and 4 arranged in the central regions of two, left and right, short sides thereof and the central region of one of two long sides thereof respectively. The other long side of the support post 1 has a rail track 5 arranged thereon for guiding a counter weight. The rail recesses 2,3,4 and track 5 extend throughout the entire length of the support post 1. The center rail recess 4 in the long side is wider and deeper than the two side rail recesses 2,3 in the short sides. The rail track 5 for guiding the counter weight is projected having an approximately triangle shape in cross section.

The support post 1 also has six lengthwisely extending T-slotted grooves 6 to 11 in the four sides thereof, one in each short side and two in each long side, for holding jigs. Each of the jig holding grooves 6 to 11 is defined by two, left and right, cross sectionally L-shaped ribs 6a,6a . . . or 11a,11a which are integrally formed on the side surface of the support post 1 to face each other. More specifically, the two L-shaped ribs 6a,6a defining the jib holding groove 6 are located on both sides of the rail recess 2 and the ribs 7a,7a defining the groove 7 are on both sides of the rail recess 3. The two jib holding grooves 8,9 are situated on both sides of the center rail recess 4 and the two other grooves 10,11 are on both sides of the counter weight guiding rail track 5.

The support post 1 has a number of hollow spaces therein for saving the material, thus being less weighted and minimized in production cost down. The plural hollow spaces are separated by reinforcement partitions 12 as shown in FIG. 1. Also, a through bore 13 is provided adjacent to the inward end of each of the short side rail recesses 2,3 for alignment of the support post 1, which extends throughout the length of the support post 1 along the center line of the rail recess and has a true round shape in cross section.

The counter weight guiding rail track 5 may be varied in the width, height, and cross sectional shape as required. For example, the rail track 5 occupies the entire long side of the support post 1 and/or is formed of a recess shape in the side surface.

The support post 1 can be used in a single post type transfer lifter as illustrated in FIGS. 2 to 5 or in a dual post type transfer lifter as illustrated in FIGS. 6 to 9. (Application 1 of the support post)

Figure 2:
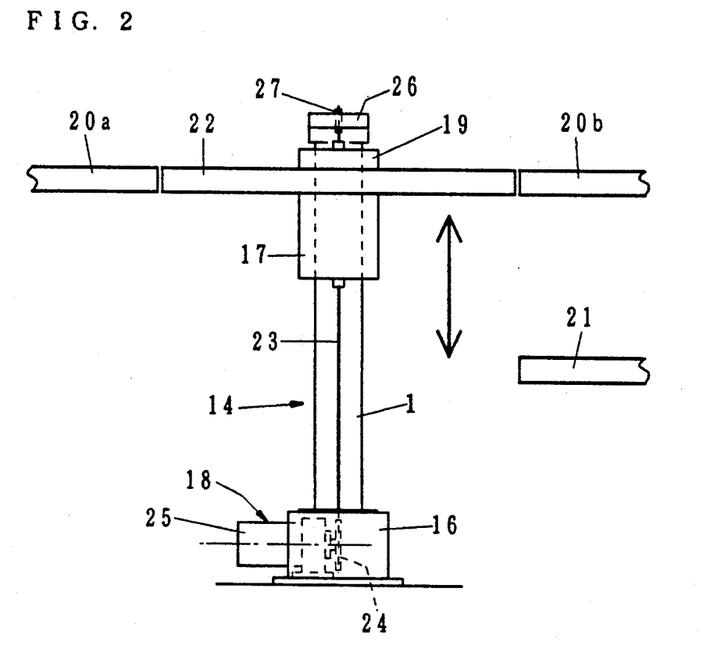
FIG. 2 is a front view of a single support post type transfer lifter provided with the support post of the present invention.
Figure 3:
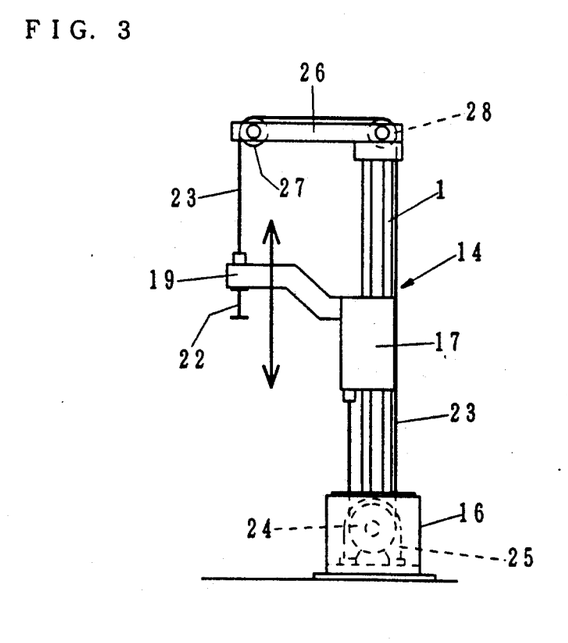
FIG. 3 is a side view of the same.

The single post type transfer lifter will be described referring to FIGS. 2 to 5 where it is denoted by 14. As best shown in FIGS. 2 and 3, the transfer lifter 14 comprises the support post 1 arranged upright on a box-shaped base 16 seating on the floor, a lifting carriage 17 capable of traveling upward and downward along the support post 1, and a lift driving means 18. The lifting carriage 17 has a jib arm 19 extending forward and a transfer guide rail 22 provided on the lower front end of the jib arm 19 for switching the route of an electric carrier cart. The guide rail 22 can be lifted upward and downward by the action of the lifting carriage 17 to make a connection with upper guide positioning of the lifting carriage 17 is determined. The carriage body 17a has guide rollers 31,32 rotatably mounted to the inner side thereof for running directly on the left and right inner walls 4a,4b of the center rail recess 4 in the long side of the support post 1 so that leftward and rightward positioning of the lifting carriage 17 is determined. As best shown in FIG. 5, the guide rollers 29 to 32 are provided at least two sets at upper and lower for maintaining the vertical position of the lifting carriage 17.

The transfer guide rail 22 on the lifting carriage 17 for switching the route of a carrier cart may be replaced with a transferred object supporting means which is mounted to the lifting carriage 17 for directly lifting and transferring the object. The support post 1 is not limited to the upright mounting on the box-shaped base 16 which contains the drive toothed wheel 24 and motor 25 of the lift driving means 18 and may be mounted at uppermost to a ceiling beam or the like. The toothed wheel 24 and motor 25 of the lift driving means 18 may be mounted on the support post 1 or more particularly, on the upper frame 26. A counter weight may also be provided for vertical movement along the back of the support post 1 in an opposite direction to the traveling of the lifting carriage 17. It is suggested that the counter weight should travel along the counter weight guide rail track 5 of the support post 1 as being suspended by the drive chain 23 at the back side of the post 1. (Application 2 of the support post) rails 20a,20b and a lower guide rail 21 alternatively.

In operation, the electric carrier cart running on the guide rails 20a,20b, or 21 will be allowed to go from one rail to another or a different height through the transfer guiding rail 22 of the transfer lifter 14.

The lift driving means 18 is consisted mainly of a loop driver chain 23 coupled at one end to the upper front end of the jib arm 19 and at the other end to the lowermost end of the lifting carriage 17 and a drive motor 25 equipped with a speed reducer for driving the chain 23 in two, forward and backward, directions via a drive toothed wheel 24 installed in the box-shaped base 16. Also, an upper frame 26 is provided extending forward from the upper end of the support post 1 and having two guide toothed wheels 27,28 rotatably mounted thereto for guiding the chain 23.

Figure 4:
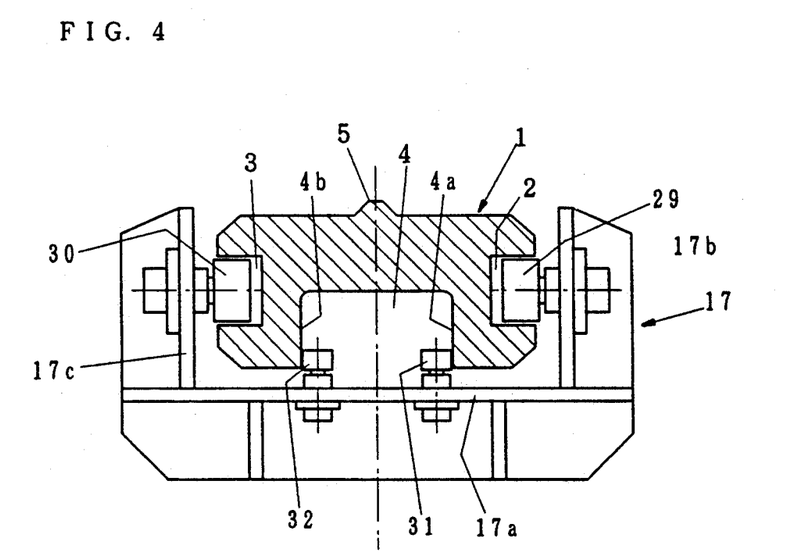
FIG. 4 is a cross sectional view showing a primary part of the same.
Figure 5:
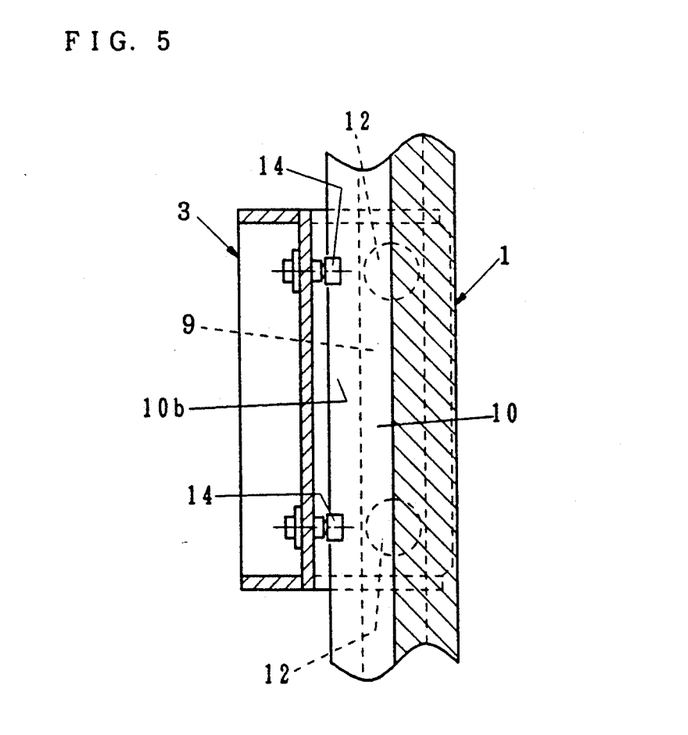
FIG. 5 is a longitudinally cross sectional view of the primary part of the same.

The support post 1 in the single post type transfer lifter 14 is arranged to stand upright with its counter weight guide rail track 5 facing backward, as shown in FIGS. 4 and 5. The lifting carriage 17 which travels upward and downward along the front side of the support post 1 comprises a carriage body 17a arranged opposite to the front side of the support post 1 and two side portions 17b,17c arranged to face the two short sides of the support post 1 respectively. The side portions 17b,17c have guide rollers 29,30 mounted to the inner side thereof respectively for engagement with their respective short side rail recesses 2,3 of the support post 1 so that forward and backward directions.

The dual post type transfer lifter 15 will now be described in more detail referring to FIGS. 6 to 9. The dual post type transfer lifter 15 comprises a couple of the support posts 1,1 mounted upright on a planer base 33 seating on the floor, a lifting carriage 34 capable of traveling upward and downward along the front side of the support posts 1,1, a counter weight 35 for vertical movement between the two support posts 1,1, and a lift driving means 36 for driving the lifting carriage 34 and the counter weight 35 to travel in opposite directions to each other.

Figure 6:
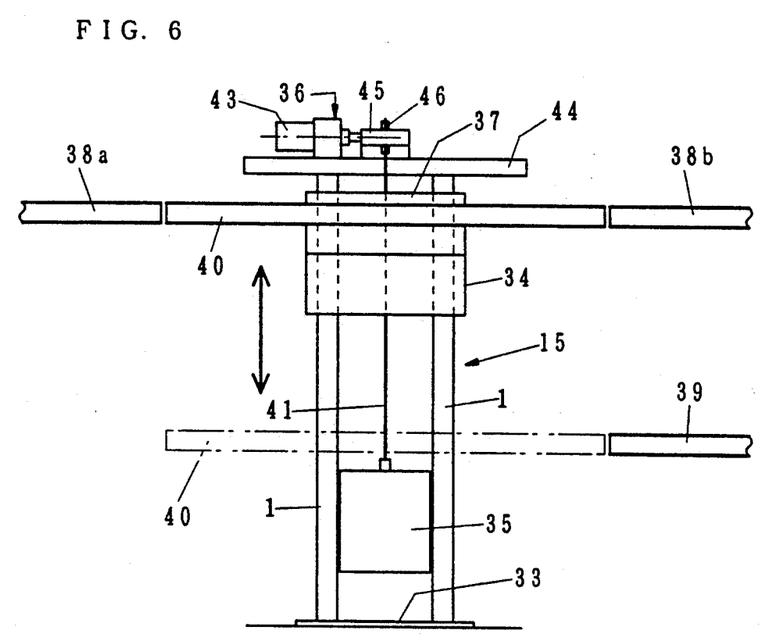
FIG. 6 is a front view of a dual support post type transfer lifter provided with the two support posts of the present invention.
Figure 7:
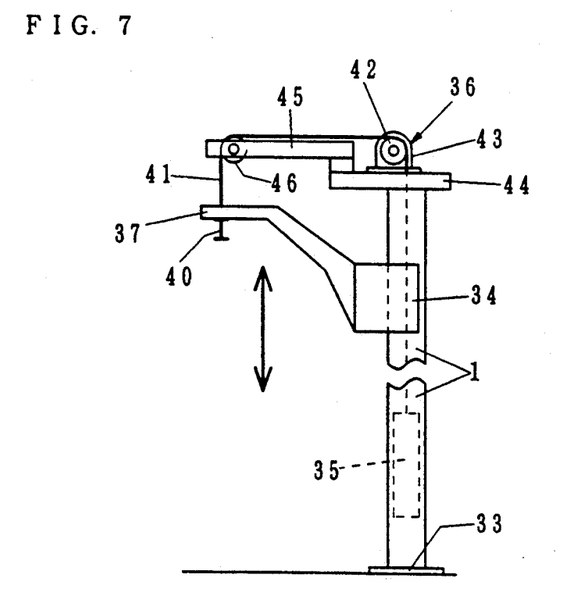
FIG. 7 is a side view of the same.

The lifting carriage 34 has a jib arm 37 extending forward and a guide rail 40 mounted to the upper front end of the jib arm 37 for switching the route of an electric carrier cart. The guide rail 40 can be lifted upward and downward by the action of the lifting carriage 34 to make a connection with upper guide rails 38a,38b and a lower guide rail 39 alternatively. In operation, the electric carrier cart running on the guide rails 38a,38b, or 39 will be allowed to go from one rail to another or a different height through the transfer guiding rail 40 of the transfer lifter 14.

The lift driving means 36 is consisted mainly of a suspending driver chain 41 coupled at one end to the upper front end of the jib arm 37 of the lifting carriage 34 and at the other end to the uppermost end of the counter weight 35, and a drive motor 43 equipped with a speed reducer for driving the chain 41 in two, forward and backward, directions via a drive toothed wheel 42. Also, a platform 44 is provided between the two uppermost ends of their respective support posts 1,1, carrying at top the toothed wheel 42 and the motor 43 of the lift driving means 36. A jib-like frame 45 is provided extending from the front end of the platform 44 and having a guide toothed wheel 46 rotatably mounted to the forward end thereof for guiding the chain 41.

Figure 8:
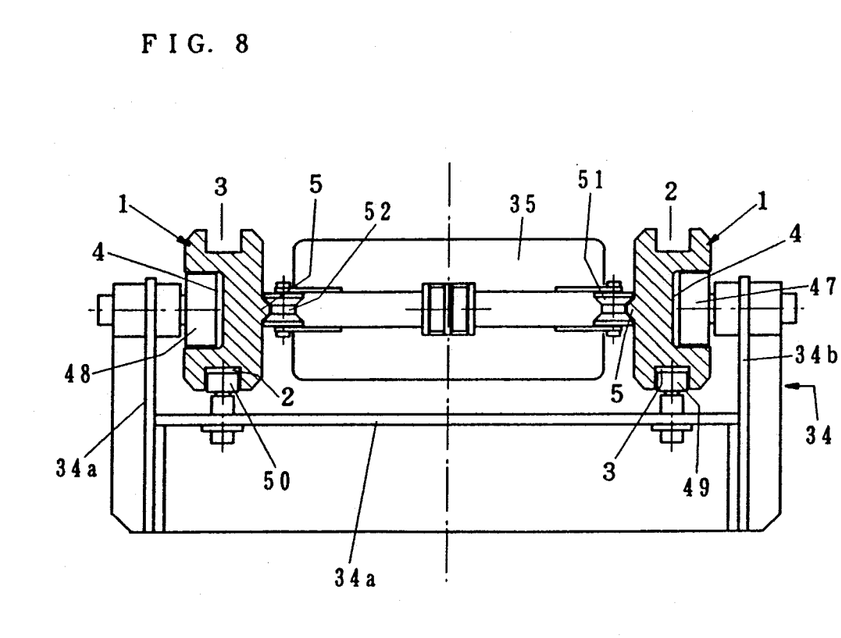
FIG. 8 is a cross sectional view showing a primary part of the same.
Figure 9:
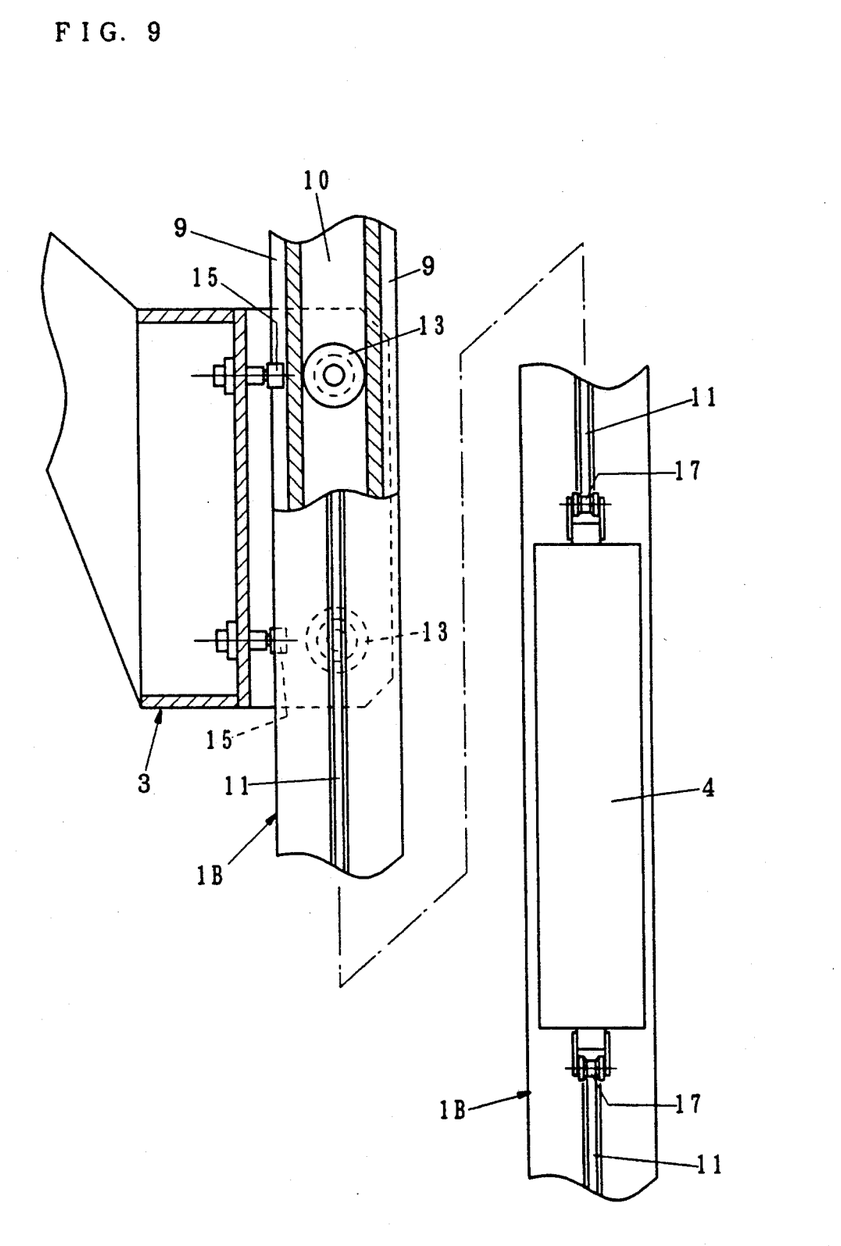
FIG. 9 is a longitudinally cross sectional view of the primary part of the same.

The two support posts 1,1 in the dual post type transfer lifter 15 are aligned upright on the base 33 so that their counter weight guide rail tracks 5,5 come to face each other, as best shown in FIG. 8. The lifting carriage 34 comprises a carriage body 34a arranged to locate at the front side of the support posts 1,1 and two side portions 34b,34c arranged to be outside the two support posts 1,1 respectively. The side portions 34b,34c have guide rollers 47,48 mounted to the inner side thereof respectively for engagement with the long side rail recesses 4,4 of their respective support posts 1,1 so that forward and backward positioning of the lifting carriage 34 is determined. The carriage body 34a has guide rollers 49,50 rotatably mounted to the inner side thereof for engagement with the short side rail recesses 3,2 of their respective support posts 1,1 so that leftward and rightward positioning of the lifting carriage 34 is determined (N.B. each support post 1 being arranged symmetrical and allowing the short side rail recesses 2 and 3 to serve as the same). As shown in FIG. 9, the guide rollers 47 to 50 are provided at least two sets at upper and lower for maintaining the vertical position of the lifting carriage 34.

The counter weight 35 has grooved guide rollers 51,52 rotatably mounted to both sides thereof for engagement with the counter weight guide rail tracks 5,5 of their respective support posts 1,1. Preferably, the guide roller 51,52 are provided at least two sets at upper and lower for maintaining the vertical position of the counter weight 35. It is also possible that one set of the grooved guide rollers 51,52 are rotatably mounted to either upper or lower region or an intermediate region of both the sides of the counter weight 35 if the counter weight 35 is allowed to run less closely.

The transfer guide rail 40 on the lifting carriage 34 for switching the route of a carrier cart may be replaced with a transferred object supporting means which is mounted to the lifting carriage 34 for directly lifting and transferring the object. If desired, two sets of the dual post type transfer lifters of the present invention will be arranged in a row so that their lifting carriages 34,34 together with the transfer guide rails 40,40 or object supporting means can lift and transfer in combination a heavy, bulky load with equal success.

Coupling of the support posts

The support post 1 having a given length is also capable of connecting one after another lengthwisely to match the full length of traveling stroke of a long-traveling lifting carriage. The coupling of the two support posts will be explained referring to FIGS. 10 to 12, in which they are denoted by 1A and 1B for ease of description. The two support posts 1A,1B having a given length are identical in the construction like as illustrated in FIG. 1. The two support posts 1A,1B are coupled to each other with an alignment pin 53 inserting into the two bores 13,13 of their respective support posts 1A,1B so that they come into close engagement with each other in no off-center relationship and their rail recesses and tracks 2,3,4,5 are aligned correctly.

Figure 12:
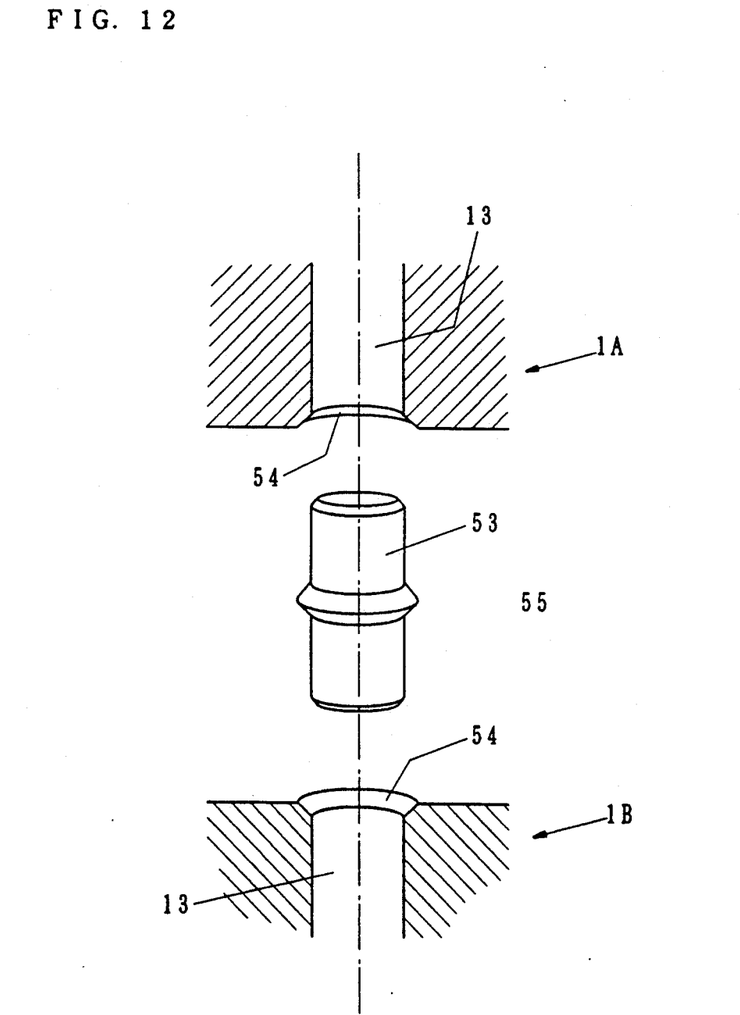
FIG. 12 is a partially cross sectional perspective view showing an alignment pin and its corresponding parts.

More specifically, the through bore 13 in each of the support posts 1A,1B is radially enlarged at the opening end forming a bevel surface 54, as shown in FIG. 12. As the two support posts 1A,1B are coupled at lengthwise end to each other, their bevel surfaces 54,54 form an enlarged space at the interface. The alignment pin 53 has a rib flange 55 arranged integrally on the lengthwise center of the periphery thereof. The rib flange 55 of the alignment pin 53 has an approximately isosceles triangle shape in cross section to be closely accepted in the above mentioned enlarged space. Also, the diameter of the alignment pin 53 corresponds to the inner diameter of each bore 13 so that it can tightly be fitted into the bores 13,13.

For coupling, the alignment pin 53 is inserted at both ends by pressing into the bores 13,13 of their respective support posts 1A,1B. The two support posts 1A,1B are then pressed axially against each other until the rib flange 55 of the alignment pin 53 comes into direct contact with their respective bevel surfaces 33,33 which are thus adjoined to each other. Accordingly, the alignment pin 53 will no more be advanced into the bores 13,13 of the support posts 1A,1B while resting at equal depth in the bores 13,13.

Figure 10:
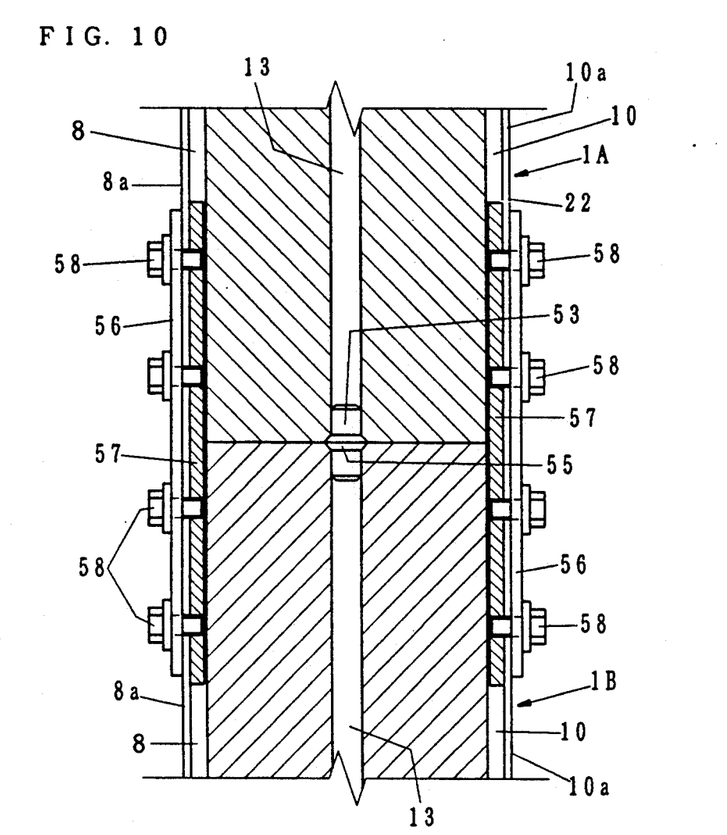
FIG. 10 is a longitudinally cross sectional view showing the coupling of the two support posts.
Figure 11:
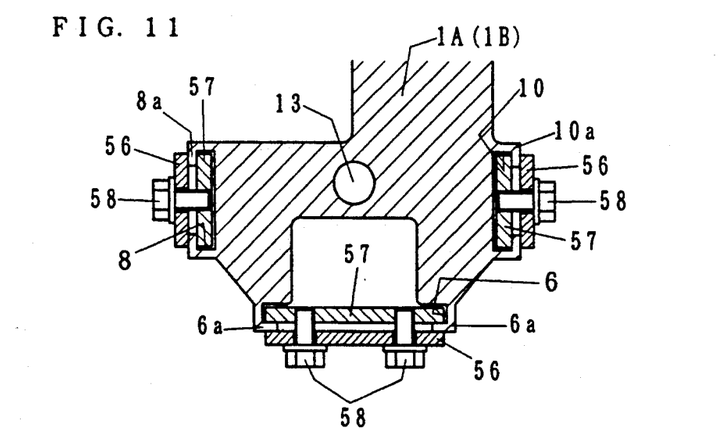
FIG. 11 is a horizontally cross sectional view showing the same.

The coupling of the two support posts 1A,1B with the alignment pin 53 is backed up with a plurality of reinforcement plates 56 and tap plates 57 which are joined each other using bolts 58. More particularly, the tap plates 57 are inserted into the jig holding grooves 6 to 11 of the two support posts 1A,1B to extend in both, upward and downward, directions from the interface. Each tap plate 57 is tightened from outside with the corresponding reinforcement plate 56 using a given number of the bolts 58. At both sides of the interface, the left and right L-shaped ribs 6a to 11a of the grooves 6 to 11 are securely held between the reinforcement plates 56 and the tap plates 57 so that the two support posts 1A,1B are coupled to each other in tightness.

Installation 1 of the support post

The single post type transfer lifter 14, shown in FIGS. 2 to 5, and the dual post type transfer lifter 15, shown in FIGS. 6 to 9, according to the present invention contain one or more of the support posts 1 mounted upright on the box-shaped base 16 and the planer base 33 respectively for supporting a lifting carriage. For the purpose, the support post 1 has to include an arrangement for mounting at the lowermost end to the base. The arrangement for mounting will be described referring to FIGS. 13 and 14.

Figure 13:
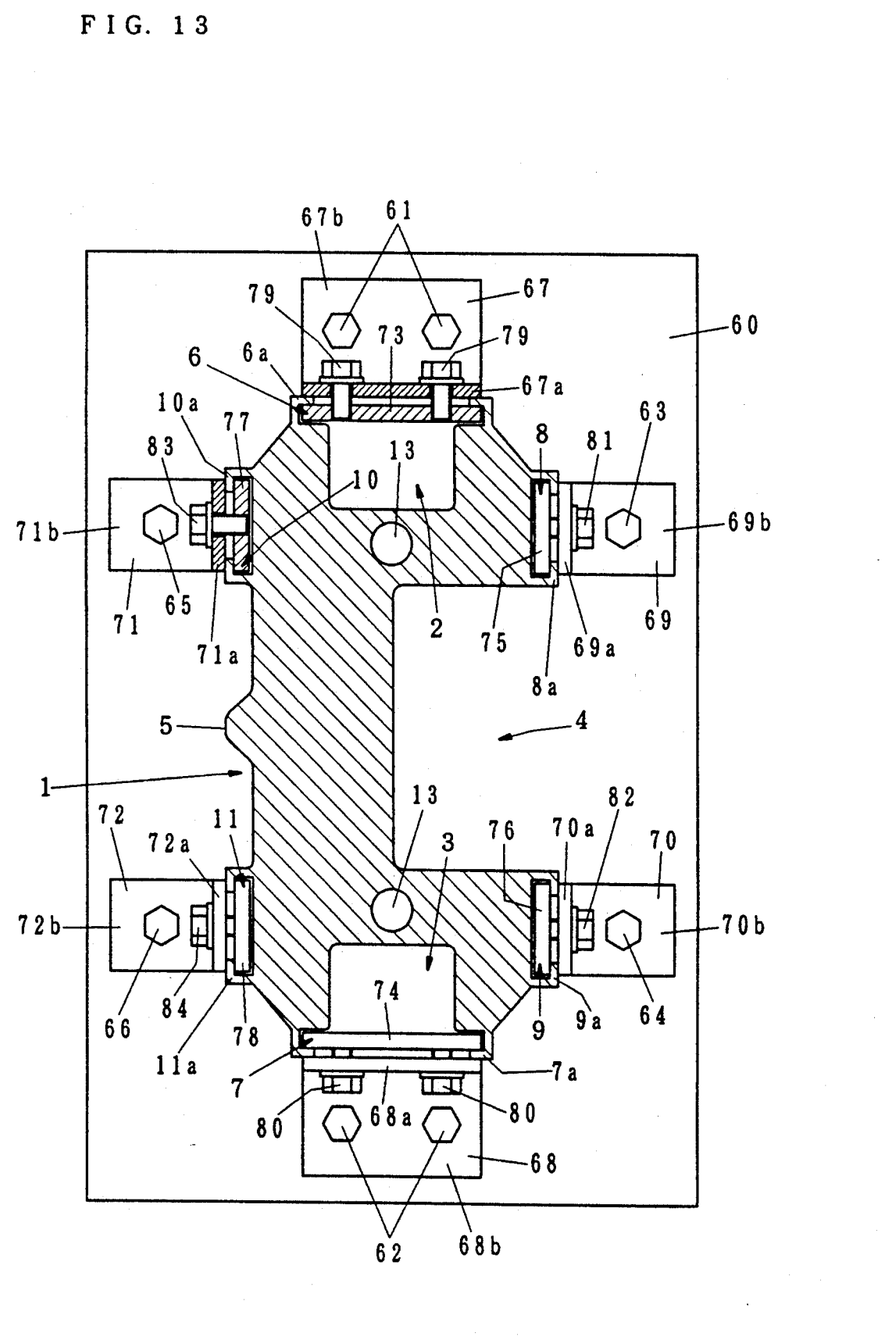
FIG. 13 is a cross sectional view showing the mounting of the support post to a mounting plate.

As shown in FIG. 13, the arrangement contains a mounting plate 60 coupled to the lowermost end of the support post with the use of L channels 67 to 72 tightened to the base 60 using pairs of bolts and buts 61 to 66, tap plates 73 to 78, and a number of bolts 79 to 84. In more particular, the tap plates 73 to 78 are inserted from lower into the T-slotted grooves 6 to 11 of the support post 1 respectively and tightened to the corresponding vertical portions 67a to 72a of the L channels 67 to 72 by the bolts 79 to 84 so as to sandwich the L-shaped ribs 6a to 11a of their respective jib holding grooves 6 to 11 inbetween. The horizontal portions 67b to 72b of the L channels 67 to 72 are tightened by the bolt-and nut pairs 61 to 66 to the mounting plate 60.

Figure 14:
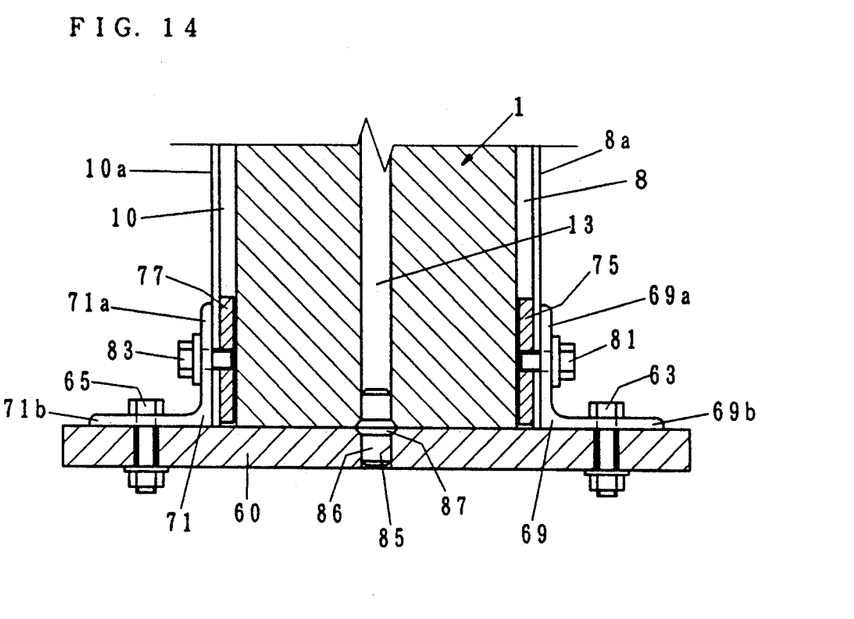
FIG. 14 is a longitudinally cross sectional view showing the same.

It is a good idea to provide the mounting plate 60 with two alignment holes 85,85 corresponding in size and location to the two bores 13,13 of the support post 1 as shown in FIG. 14. A couple of alignment pins 86,86 which are identical in construction to the alignment pin 13 previously explained with FIG. 12 are fitted at one end into the bores 13,13 of the support post 1 and at the other end into the holes 85,85 of the mounting plate 60 so that the support post 1 can be coupled to the mounting plate 60 at higher precision. The coupling of the support post 1 to the mounting plate 60 will be encouraged by a similar manner to that described with FIG. 12 in which the alignment pin 86 has a rib flange 87 provided on a lengthwise center region of the periphery thereof and both the bore 13 and the hole 85 are radially enlarged at opening end thus forming bevel surfaces for accepting the rib flange 87 of the pin 86. Accordingly, each alignment pin 86 after insertion remains at equal depth in the bore 13 and the hole 86.

Figure 15:
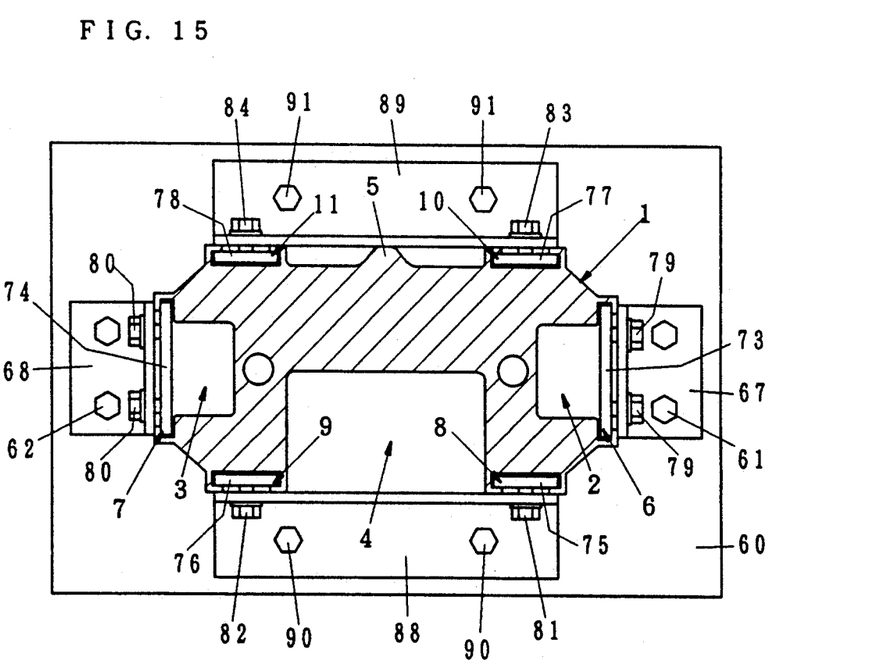
FIG. 15 is a cross sectional view showing a modification of the mounting of the support post illustrated in FIG. 13.

In case that the chain or other components of the lift driving means is arranged at a distance from the long side of the support post 1 e.g. in the dual post type transfer lifter 15 illustrated in FIGS. 6 to 9, the six L channels 67 to 72 assigned to their respective jig holding grooves 6 to 11 of the support post 1 for coupling to the mounting plate 60, may be replaced with the two L channels 61,62 and two large-sized L channels 88,89 as shown in FIG. 15. For mounting, the two large-sized L channels 88,89 are tightened by the bolts 81,82,83,84 to two pairs of the tap plates 75,76 and 77,78 respectively which have been inserted into the jig holding grooves 8,9,10,11 of the support post 1. Each of the large-sized L channels 88,89 is secured to the mounting plate 60 with a couple of bolts 90,91.

It is also a good idea for the mounting with the large-size L channels 88,89 that the counter weight guide rail track 5 of the support post 1 is arranged flush with the top surfaces of the L-shaped ribs 10a,11a of the jig holding grooves 10,11 so that the large-sized L channel 89 can directly be supported at center by the uppermost end of the counter weight guide track 5 to increase the strength in tightening.

The mounting plate 60 is adapted for fixedly mounting to the box-shaped base 16 or planer base 33 and may be replaced with a top plate of the box-shaped base 16 or a member plate of the planer base 33.

The L channels 67 to 72, 88, and 89 are also applicable to coupling of the upper frame 26 (see FIG. 3) or platform 44 (see FIG. 7) to the uppermost end of the support post 1. It is possible that those L channels are replaced with appropriate brackets which can carry a detector(s) or sensor arm(s) at a given height(s) along the support post 1 and/or a safety netting to shield the traveling path of the lifting carriage of the support post 1.

Installation 2 of the support post

It is understood that the mounting plate 60 coupled to the lowermost end of the support post 1 can be mounted to the box-shaped base 16 or planer base 33 at a given height and/or a given angle. The mounting of the two support posts 1,1 in the dual post type transfer lifter shown in FIGS. 6 to 9 to the planer base 33 will now be explained referring to FIGS. 16 to 19.

Figure 16:
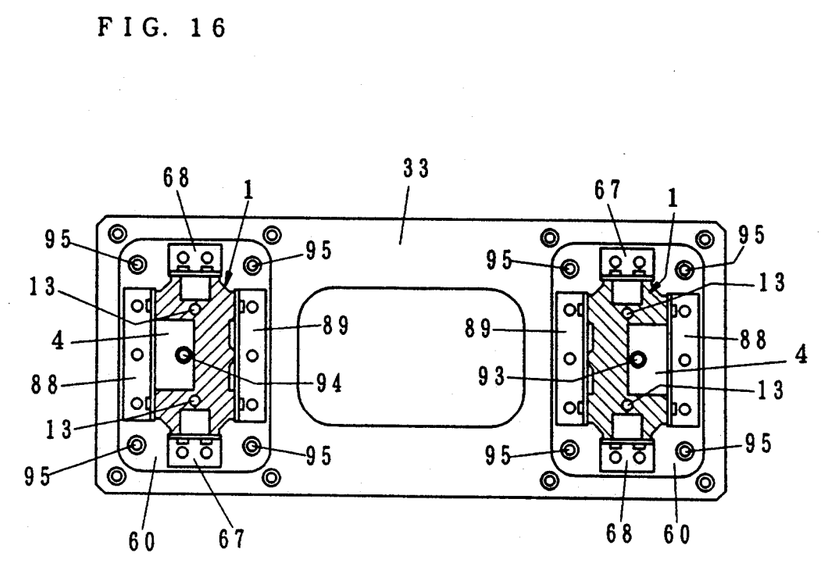
FIG. 16 is cross sectional view showing the mounting of the two support posts in a dual post type transfer lifter.
Figure 17:
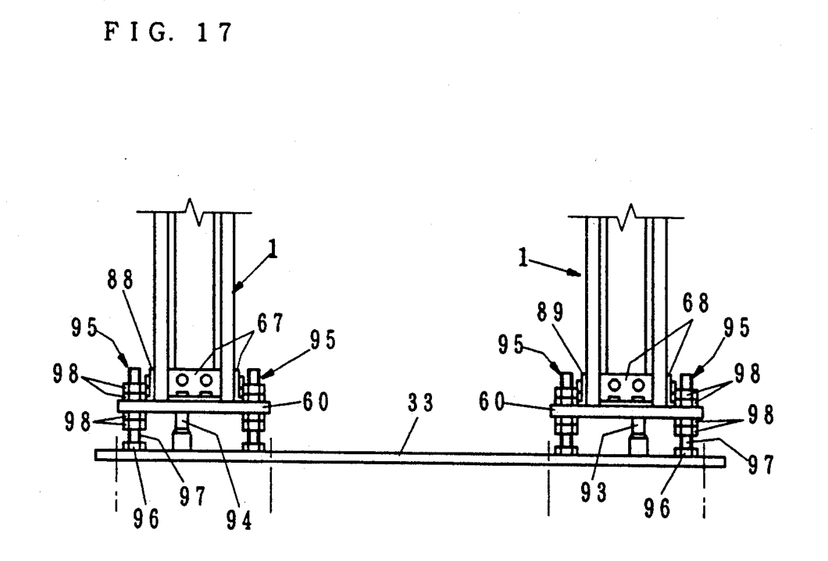
FIG. 17 is a front view showing the same.

Each of the two support posts 1,1 is coupled to the mounting plate 60 by the same manner as described previously in Installation 1. In particular, the mounting plate 60 has a center hole 92 provided therein to open to the long side rail recess 4 of the support post 1. The planer base 33 (see FIG. 6) carries two guide studs 93,94 provided vertically on the support post 1 mounting positions thereof for fitting into the center holes 92,92 of their respective mounting plate 60,60. Also, each of the mounting plates 60,60 is supported at four corners with four sets of height leveling bolts and nuts 95,95,95,95 placed on the planer base 33.

Figure 18:
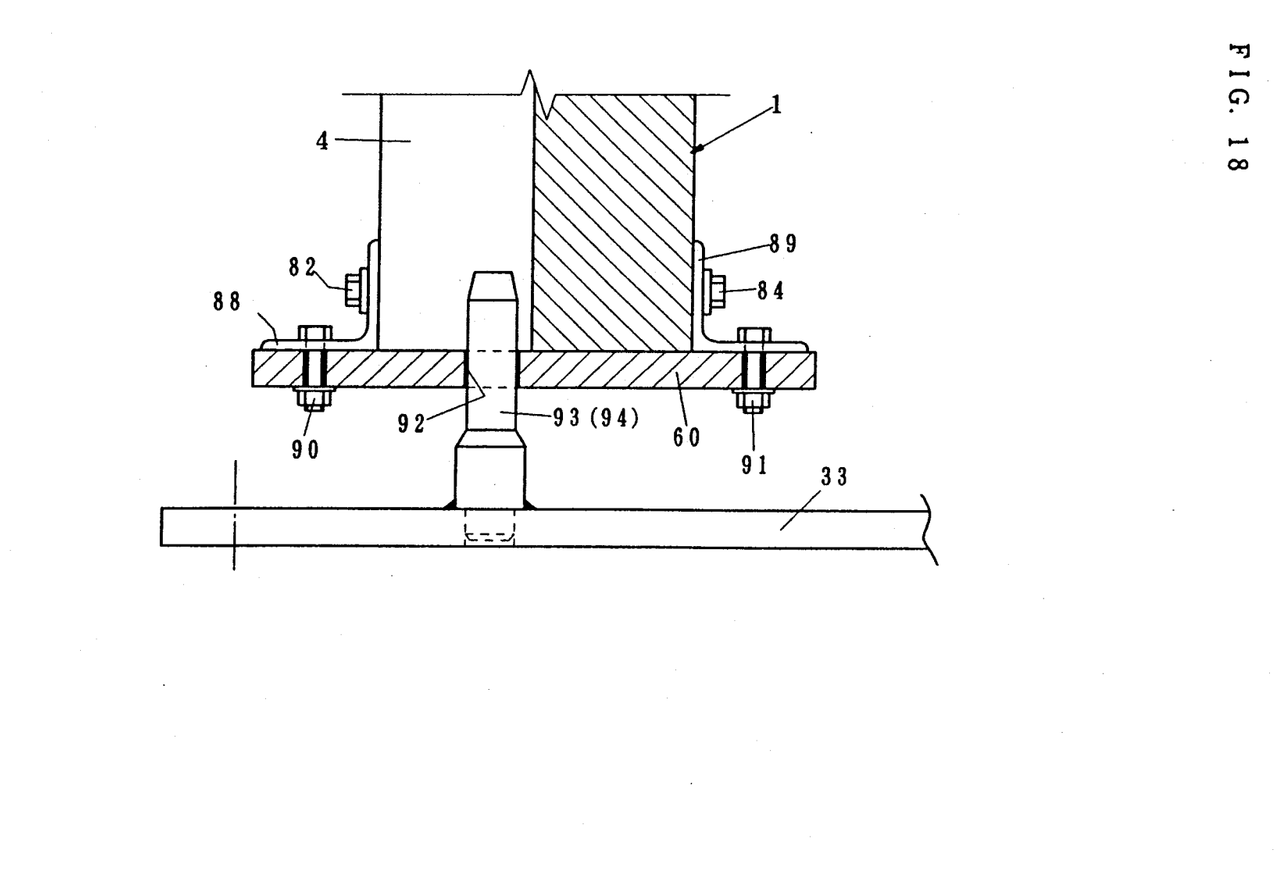
FIG. 18 is a longitudinally cross sectional view showing a guide stud region of the same.

Each height leveling bolt and nut set 95 comprises a vertically extending stud bolt 97 which is screwed at lower end into a stationary nut 96 fixedly mounted to the upper surface of the planer base 33 and at upper end, fitted into the hole 92 of the mounting plate 60, and a plurality of nuts 98 which are threaded onto the stud bolt 97 for tightening the mounting plates 60 from upper and lower. The height and level of the support post 1 can be controlled by adjustment with the nuts 98.

Modification of the alignment pin

Figure 19:
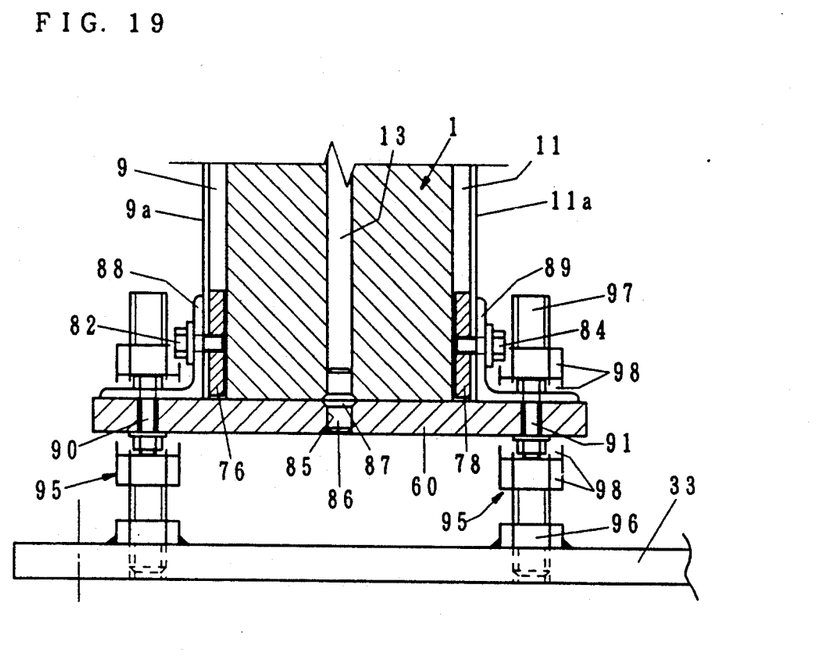
FIG. 19 is a longitudinally cross sectional view showing an alignment pin region of the same.

The alignment pin 53 for coupling of the two support posts 1,1 shown in FIGS. 10 and 12 and the alignment pin 86 for coupling the support post 1 to the mounting plate 60 shown in FIGS. 14 and 19 are provided with the rib flanges 55,87 respectively which have an approximately isosceles triangle shape in the cross section. Hence, the bore 13 and the hole 85 for accommodating the pins 53,86 respectively have to be provided with enlarged portions, which forms bevel surfaces, at the opening end for accepting their respective flanges 55,87. For alteration, another alignment pin 101 modified from the alignment pin 53 or 86 is provided which has a rib flange 100 integrally formed on a central region of the periphery thereof. More specifically, the fib flange 100 has a flat upper surface extending at a right angle to the axis of the pin 101 and a tapered lower surface. This allows the bore 13 of the support post 1 to be provided with no radially enlarged portion at the lower opening end while the alignment hole 85 of the mounting plate 60 has at upper opening end an enlarged portion 102 thereof for accepting the rib flange 100 of the alignment pin 101. In other words, the support post 1 can easily be fabricated as being cut off by a given length from the full length of an aluminum post-shaped casting material.

Figure 20:
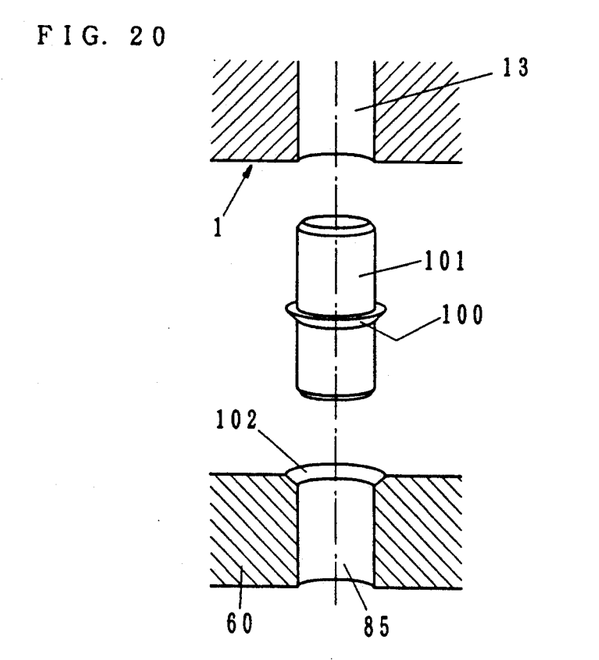
FIG. 20 is a partially cross sectional perspective view showing another alignment pin and its corresponding parts.

When the alignment pin 101 has been pressed into the hole 85 of the mounting plate 60, its flat upper surface becomes flush with the supper surface of the mounting plate 60 while its lower surface rests in the enlarged portion 102 of the hole 85. The support post 1 is then placed in such a position on the mounting plate 60 that its bore 13 accepts the upper half of the alignment pin 101, thus being located correctly.

The alignment pin 101 may be replaced with the alignment pin 53 (see FIG. 10) for coupling the two support posts 1,1 to each other.

What is claimed is:

1. A carriage guiding post in a transfer lifter, comprising a four-sided support post of an approximately square shape in cross section said support post having carriage guiding rail recesses provided in three of the four sides thereof, and a counter weight guiding rail track provided on the remaining side of said support post, said carriage guiding rail recesses and said counter weight guiding rail all extend continuously throughout the length of the support post, wherein said counter weight guiding rail track is a rib projecting from a central region of the side of the support post and extends lengthwise thereof, said rib having an approximately isosceles triangle shaped cross section.

2. A carriage guiding post in a transfer lifter according to claim 1, wherein the cross section of the support post is an approximately rectangular shape and the carriage guiding rail recesses are provided in the two short sides and one of the two long sides thereof, the rail recess in the long side being greater in width than those in the two short sides.

3. A carriage guiding post in a transfer lifter according to claim 2, wherein the support post has six jib holding T-slotted grooves provided in the four sides thereof, one in each short side and two in each long side, which extend groove being located at the center of the short side between the two, left and right, L-shaped projections, the long side grooves being located on both sides of the counter weight guiding rail track and of the carriage guiding rail recess.

4. A carriage guiding post in a transfer lifter according to claim 1, wherein the support post has at least two alignment bores provided therein which extends throughout the length of the support post.

5. A carriage guiding post in a transfer lifter according to claim 4, wherein each of the two alignment bores of the support post is arranged to accept the half of an alignment pin for coupling two of the support posts in a lengthwise direction, the alignment pin having a rib flange provided on a central region of the side periphery thereof, at least one of the two corresponding alignment bores of the two support posts to be coupled being radially enlarged at opening end for accepting the rib flange of the alignment pin.

6. A carriage guiding post in a transfer lifter according to claim 4, wherein each of the two alignment bores of the support post is arranged to accept the half of an alignment pin for coupling the carriage guiding post to a base, such as a foundation plate or stand, which also has corresponding alignment holes therein to the alignment bores of the support post, the alignment pin having a rib flange provided on a central region of the side periphery thereof and being inserted at one end into the alignment bore of the support post and at the other end into the alignment hole of the base, at least either the alignment bore of the support post or the alignment hole of the base to be coupled being radially enlarged at opening end for accepting the rib flange of the alignment pin.

7. A carriage guiding post in a transfer lifter according to claim 1, wherein the support post is coupled at lowermost end to a mounting plate which is movably fitted onto vertical guide studs mounted on the base, and supported with a plurality of bolts and nuts which are arranged on the base for controlling the height and level of the mounting plate.

8. A carriage guiding post in a transfer lifter according to claim 1, wherein the support post is fabricated by extrusion forming of an aluminum material to a given length.

9. A transfer lifter comprising: a carriage guiding post, such as defined by claim 1, arranged upright with its counter weight guide rail track towards the back,; and a lifting carriage having forward and backward positioning guide rollers rotatably mounted thereto for running in and along the rail recesses of the two, left and right, sides of the carriage guiding post and leftward and rightward positioning guide rollers rotatably mounted thereto for running on the two, left and right, inner walls of the rail recess of the front side of the same so that the lifting carriage can travel upward and downward along the front side of the carriage guiding post.

10. A transfer lifter comprising: two carriage guiding posts, such as defined by claim 1, arranged upright with their counter weight guide rail tracks facing each other; a lifting carriage having forward and backward positioning guide rollers rotatably mounted thereto for running in and along the rail recesses of the outer sides of their respective carriage guiding posts and leftward and rightward positioning guide rollers rotatably mounted thereto for running in and along the rail recesses of the front sides of the same so that the lifting carriage can travel upward and downward along the front sides of the two carriage guiding posts; and a counter weight having guide rollers rotatably mounted thereto for running on the counter weight guide rail tracks of the inner sides of the two carriage guiding posts so that it can travel between the two carriage guiding posts in the opposite direction or the lifting carriage.

* * * * *